UNITED STATES PATENT OFFICE.

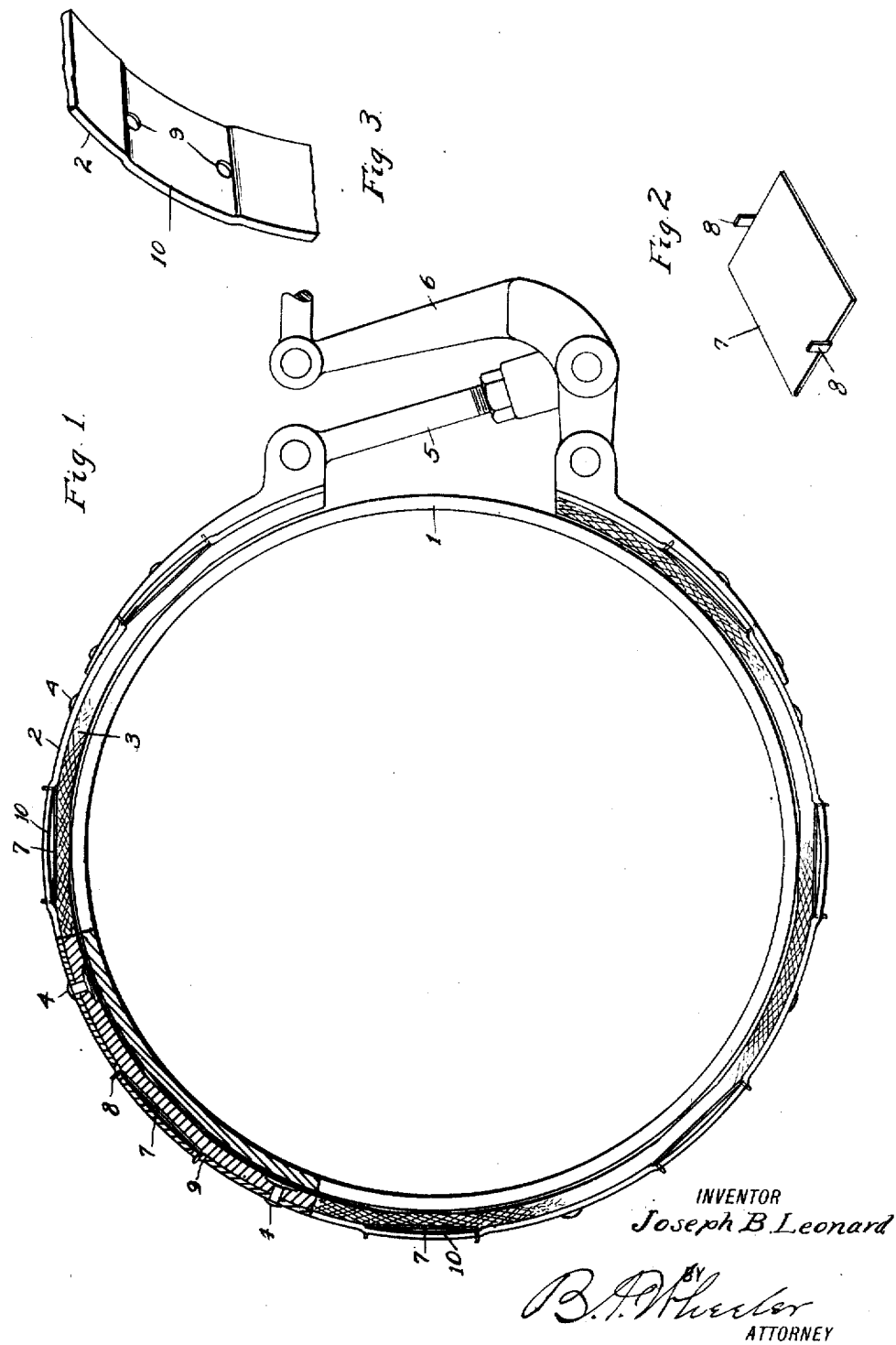

JOSEPH B. LEONARD, OF DETROIT, MICHIGAN

BRAKE-BAND.

1,273,507.    Specification of Letters Patent.    Patented July 23, 1918.

Application filed April 14, 1917. Serial No. 161,946.

*To all whom it may concern:*

Be it known that I, JOSEPH B. LEONARD, a citizen of the United States, residing at Detroit, in the county of Wayne and State of Michigan, have invented a new and useful Brake-Band, of which the following is a specification.

This invention relates to brake bands especially adapted for use on vehicle wheels. The invention has for its principal object to provide in a brake band, of the general character commonly employed for braking the wheels of motor vehicles, simple and efficient means to enable the application of the pressure of the brake band upon the drum of the brake to be more gradually brought into gripping service, so as not to subject the vehicle to shocks and jars resulting from the sudden operation of the brakes, while at the same time enabling the maximum braking surface of the band and drum to be effectively brought into service.

In attaining the above object the invention contemplates the employment, in connection with the brake band and its usual yieldable lining embracing the brake drum, of a plurality of flexible plates interposed at intervals circumferentially and tangentially between the band and lining so as to deflect the latter inwardly to the arc of the former and present to the periphery of the brake drum a circular series of spaced bearing surfaces engageable with the drum upon a partial contraction of the band to exert an initial braking pressure thereon, and yielding under the further contraction of said band to permit the intervening portions of the lining to be brought into surface contact with said drum and to participate in the final braking pressure exerted thereon.

A preferred structural embodiment of the essential features of the present invention is illustrated in the accompanying drawings, in which, Figure 1 is a sectional elevation of a drum and brake band equipped with a plurality of flexible inserts or bearing plates in accordance with my invention.

Fig. 2 is a perspective view of one of the plates detached.

Fig. 3 is a perspective view of a portion of the brake band showing a depression therein for the reception of the plate shown in Fig. 2.

Referring to the parts of the device by the characters of reference marked on the drawings, 1 represents a brake drum which is embraced by a split band 2 having a yieldable lining strip 3 secured to the inner face thereof by rivets 4, and which is adapted to be drawn into peripheral contact with the drum through contraction by means of the usual link 5 and lever 6 pivotally connecting the free ends of the band as is common in the art.

In the operation of brakes of this character more or less difficulty is experienced in applying the braking pressure of the band gradually to the drum, owing to the relatively large bearing surfaces presented between the band and drum, and the consequent tendency of the engaging surfaces to grip abruptly when brought into contact by the contraction of the brake band. To overcome this difficulty I insert between the inner and outer arcs of the brake band 2 and lining 3 a plurality of circumferentially spaced flexible plates 7 which lie in the plane of a chord to the arc of the brake band with which said plates engage at opposite ends and serve to deflect adjacent portions of the lining strip inwardly toward the periphery of the brake drum.

The ends of the plates 7 are provided centrally with integrally formed upturned or lateral tongues 8 which are received in apertures 9 formed through the brake band, by means of which said plates are retained against displacement, said tongues fitting sufficiently free in the apertures to permit of angular movement therein with the flexing of the body of the plate in conforming to the arc of the brake band through the engagement under pressure of the deflected portions of the lining with the periphery of the brake drum when said band is contracted.

Ordinarily the plates 7 are comparatively thin, and owing to the pliable nature of the lining they will become embedded therein sufficiently to allow the intermediate portions of the lining to be brought into bearing engagement with the drum following the initial contraction of the band so that the entire braking surface of the lining may finally be brought into service. However, it may be desirable in order to insure uniformity in the arc of the bearing surface of the lining upon the drum to depress peripheral portions of the brake band adjacent the plates in the form of pockets as at 10 to compensate for the thickness and receive the body of the plate when depressed.

It will now be clear from the foregoing description that yieldable bearing points will be formed at intervals of the arc of the lining opposite the inserted plates which will act to gradually apply pressure to the drum upon the initial contraction of the band, and that these points of bearing will recede with the increasing pressure on the band so as to allow the entire or normal braking surface of the band to be brought into service, thus enabling the application of the pressure to be gradually applied and overcoming the liability of shocks and jars resulting from the too abrupt engagement of the gripping surfaces of the brake.

I claim:

1. In a brake, the combination with a drum and a contractible band therefor, said band having a yieldable lining for engagement with said drum, of a circular series of flat flexible plates interposed between said band and lining in surface contact with said lining and bearing at opposite ends upon the inner arcuate face of said band, and means to retain said plates in fixed spaced relation between said band and lining.

2. In a brake, the combination with a drum and a contractible band therefor, said band having a yieldable lining for engagement with said drum, of a plurality of circumferentially spaced flat flexible plates interposed between said band and lining in engagement at opposite ends with the inner arcuate face of said band and yieldably supporting and deflecting contiguous portions of said lining inwardly of the arc of said band, and means to retain said plates loosely engaged with said band.

3. In a brake, the combination with a drum and a contractible band therefor, said band carrying a yieldable lining for engagement with said drum, of a plurality of circumferentially spaced flat plates inserted between said band and lining in bearing engagement at opposite ends with the inner arcuate face of said band and yieldably supporting and deflecting contiguous portions of said lining inwardly of the arc of said band, and anchoring members carried by said plates and interlocking with said band for retaining said plates against displacement therewith.

4. In a brake, the combination with a drum and a contractible band having a yieldable lining for engagement with said drum, said band having a plurality of circumferentially spaced arcuate depressions in the inner face thereof, of flat flexible plates seated at opposite ends respectively in opposite ends of said depressions and yieldably supporting and deflecting contiguous portions of said lining inwardly of the arc of said band, and means to loosely retain said plates in said depressions.

5. In a brake, the combination with a drum and a contractible band having a yieldable lining for engagement with said drum, said band having a circular series of spaced apertures in the wall thereof, of flat flexible plates interposed between said band and lining in bearing contact at opposite ends with the inner arcuate face of said band and yieldably deflecting engaged portions of said lining inwardly of the arc of said band, and lateral tongues on said plates freely engaged in said apertures for loosely retaining said plates engaged with said band.

6. In a brake, the combination with a drum and a contractible band having a yieldable lining for engagement with said drum, of a series of circumferentially spaced depressions in the inner arc of said band having apertures in opposite ends thereof, flat flexible plates seated at opposite ends respectively in opposite ends of said depressions and yieldably supporting and deflecting contiguous portions of said lining inwardly of the arc of said band, and lateral tongues integral with the ends of said plates freely received in said apertures for retaining said plates movably engaged with said band.

In testimony whereof I sign this specification.

JOSEPH B. LEONARD.